United States Patent (10) Patent No.: US 7,343,155 B2
Cheng et al. (45) Date of Patent: Mar. 11, 2008

(54) MAXIMUM RATIO COMBINING OF CHANNEL ESTIMATION FOR JOINT DETECTION IN TD-SCDMA SYSTEMS

(75) Inventors: Jian Cheng, Shanghai (CN); Jiayi Zhuang, Shanghai (CN)

(73) Assignee: Spreadtrum Communications Corporation, Sunnyvale, CA (US)

( * ) Notice: Subject to any disclaimer, the term of this patent is extended or adjusted under 35 U.S.C. 154(b) by 651 days.

(21) Appl. No.: 10/966,955

(22) Filed: Oct. 15, 2004

(65) Prior Publication Data

US 2006/0084425 A1   Apr. 20, 2006

(51) Int. Cl.
*H04Q 7/20* (2006.01)
(52) U.S. Cl. ............... 455/423; 455/522; 370/458
(58) Field of Classification Search ........... 455/522, 455/423, 562.1, 561; 370/458, 318
See application file for complete search history.

(56) References Cited

U.S. PATENT DOCUMENTS

2006/0072605 A1*   4/2006   Terry et al. .................. 370/458
2006/0148509 A1*   7/2006   Koo et al. .................... 455/522

* cited by examiner

*Primary Examiner*—Joseph Feild
*Assistant Examiner*—Phuoc Doan
(74) *Attorney, Agent, or Firm*—Perkins Cocie LLP

(57) ABSTRACT

The embodiments of the present invention relate to the general area of wireless communication systems and, in particular, to channel estimation for joint detection of data signals in TD-SCDMA systems. While time slots and spreading codes separate the users in a TD-SCDMA system, multiple access interference affects all its users. To deal with this problem detection schemes such as joint detection are used, which process all users' signals in parallel and include the interference information from all the users. An important part of the joint detection process is channel estimation and, as such, affects the detection process in different ways. In general, the more accurate the channel estimation is, the better the system performance will be. This invention presents methods and systems for channel estimation of TD-SCDMA systems.

18 Claims, 2 Drawing Sheets

MAXIMUM RATIO COMBINING OF CHANNEL ESTIMATION FOR JOINT DETECTION IN TD-SCDMA SYSTEMS

TECHNICAL FIELD

The concepts of this invention relate generally to wireless communication systems and, in particular, to channel estimation for joint detection of data signals in a TD-SCDMA system.

BACKGROUND

Mobile communication is increasingly advancing in popularity while digital processing has enabled a rapid migration of mobile wireless services from analog to digital communications. More and more, the cellular service providers are focusing on techniques for high-capacity communication of digital information over wireless links.

In 1998 the Chinese Wireless Telecommunications Standards proposed to the International Communications Union a new standard that is based on Time Division Duplexing (TDD) and Synchronous Code Division Multiple Access (CDMA) technology (TD-SCDMA) for TDD. The International Communications Union has approved and adopted this proposal. The adopted system has several advantages over $2^{nd}$ generation and other $3^{rd}$ communication systems.

The TDD uses a single frequency band for uplink as well as downlink, however, uplink and downlink occur at different predetermined time slots. The CDMA is based on Direct-Sequence Spread-Spectrum (DS-SS) principles, where multiple users simultaneously occupy the same radio frequency channel, separated only by user-specific spreading or signature sequences. As a result, in TD-SCDMA system, time slots and spreading codes separate the users in a cell. TD-SCDMA also includes support for innovative use of key technologies such as smart antennas, joint detection, and dynamic channel allocation to achieve near optimal performance.

DS-SS communication requires detection of one or more spreading chip-code sequences embedded in an incoming spread-spectrum signal as well as subsequent synchronization of the receiver with the detected chip-code sequence. Also, prior to transmission, predetermined symbols (e.g., midambles) are inserted in each frame to detect and compensate for the distortion of the information symbols by comparing the received symbols to the predetermined symbols. In other words a transmitter inserts, what is called, training symbols in each frame, and a receiver, which already expects these training symbols, extracts the distorted symbols from the received frames and uses their distortion information for channel estimation.

In a CDMA environment, as well as other types of communication employing DS-SS, two or more transmitters may transmit at the same time using different spreading codes. In such a situation, particularly if the receiver must receive the transmissions simultaneously, the receiver must search for and acquire multiple codes at the same time from within a broad-spectrum wireless signal. In a CDMA system, the multiple access interference (MAI) affects all users equally. While detection schemes such as the Rake receiver are sub-optimal because they only consider the user's signal information without any attempt to characterize the interference from other users, the joint detection algorithms process all users of the cell in parallel which includes the interference information from all.

Joint detection schemes are complex and computationally intensive.

Complexity grows exponentially as the number of codes increases. Therefore, joint detectors are not suitable for use in other CDMA systems because of the high number of codes used in those systems. However, joint detection and its associated parallel processing are well suited for TD-SCDMA systems because in every time slot the users are synchronized and are limited to a very manageable number. The result is a joint detector of reasonable complexity that can easily be implemented in today's parallel computational architectures. However, the accuracy of the detected signals in a joint detector is directly related to the quality of its channel estimation, which is an essential part of a joint detector. In general, the more accurate the channel estimation, the better the system performance.

BRIEF DESCRIPTION OF THE DRAWINGS

The foregoing aspects and many of the attendant advantages of the invention will become more readily appreciated as the same become better understood by reference to the following detailed description, when taken in conjunction with the accompanying drawings, wherein.

DETAILED DESCRIPTION

Figure 1:
FIG. 1 is a configuration diagram of a typical TD-SCDMA time slot.

In the following description, several specific details are presented to provide a thorough understanding of the embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this "Detailed Description" section.

Reference throughout the specification to "one embodiment" or "an embodiment" means that a particular feature, structure, implementation, or characteristic described in connection with the embodiment is included in at least one embodiment of the present invention. Thus, the phrases "in one embodiment" or "in an embodiment" in various places throughout the specification do not necessarily all refer to the same embodiment. Furthermore, the particular features, structures, implementations, or characteristics may be combined in any suitable manner in one or more embodiments. This invention relates to channel estimation for joint detection of data signals in TD-SCDMA communication system. A key technology in TD-SCDMA system is "Joint Detection" at the UE (user equipment) side, which can increase the communication capacity by depressing the interference from other serving users. An advantage of the joint detection algorithms over other detection methods is that the joint detection algorithms process the signals from all the users in parallel and include the interference information from all the users.

Since joint detection schemes are complex and computationally intensive and their complexity grows exponentially as the number of codes increases, in general, they are not the best choice for use in CDMA systems because of the high number of codes used in those systems. However, joint detection is well suited to TD-SCDMA systems because of the limited and very manageable number of users in a time slot. Furthermore, the users are synchronized in each time slot.

Channel estimation is a vital part of a joint detection process and affects the detection process in different ways. In general, the more accurate the channel estimation is, the better the system performance will be. This invention presents methods and systems for improving the channel estimation of TD-SCDMA communication systems, when no smart antenna is adopted and the TD-SCDMA system is working in the default mode.

In time division duplexing (TDD) data is transmitted as symbols in data packets of predetermined duration or a "time slot." Each data packet includes a predetermined training sequence or midamle within the time slot. The midamble code included in the transmitted packet, which is also known to the receiver, along with the received distorted version, are used for channel estimation and ultimately for correction and compensation of the information symbols in the same data packet. In a TD-SCDMA system, a "Basic Midamble Code ("midamble")" is assigned to each node-B. When the system is in the default mode, the midamle is shifted to different phases for different users in that node.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in "Detailed Description" section using the singular or plural number may also include the plural or singular number, respectively. When the claims use the word "or" in reference to a list of two or more items, that word covers all of the following interpretations of the word: any of the items in the list, all of the items in the list, and any combination of the items in the list.

FIG. 1 is a configuration diagram of a typical TD-SCDMA time slot, where there are 144 midamble chips. In such a configuration, the midamble can be presented as:
$m_P = (m_1, m_2, \ldots, m_P)$
which is transformed into a complex form as:
$\underline{m}_P = (\underline{m}_1, \underline{m}_2, \ldots, \underline{m}_P)$; where $\underline{m}_i = (j)^i \cdot m_i$ for all $i=1, \ldots, P$, $P=128$, and $j=\sqrt{-1}$.

Defining $i_{max} = L_m + (K-1)W$, a new vector $\underline{m}$ is obtained containing the periodic midamble sequence: $\underline{m} = (\underline{m}_1, \underline{m}_2, \ldots, \underline{m}_{i_{max}}) = (\underline{m}_1, \underline{m}_2, \ldots, \underline{m}_{L_m + (K-1)W})$, where $\underline{m}_i = \underline{m}_{i-P}$ for the subset $i = (P+1), \ldots, i_{max}$.

The $k^{th}$ midamble is given as:
$\underline{m}^{(k)} = (\underline{m}_1^{(k)}, \underline{m}_2^{(k)}, \ldots, \underline{m}_{L_m}^{(k)})$, where $\underline{m}_i^{(k)} = \underline{m}_{i+(-k)W}$ with $i=1, \ldots, L_m$ and $k=1, \ldots, K$.

Figure 2:
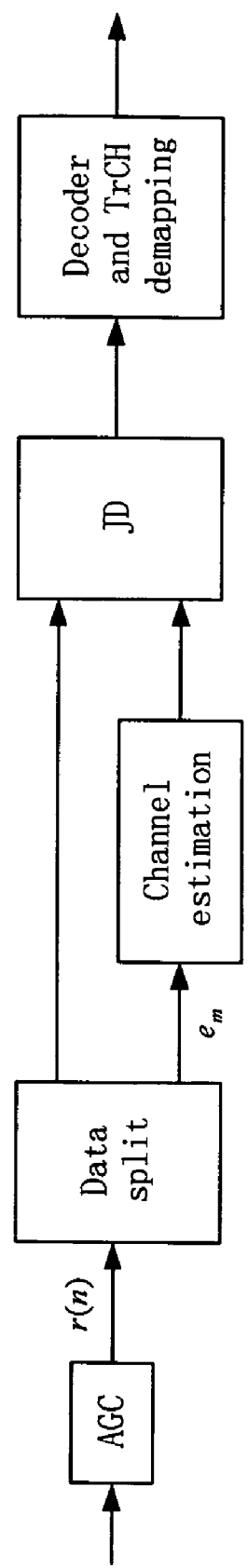
FIG. 2 is a digital baseband configuration of a User Equipment.
Figure 3:
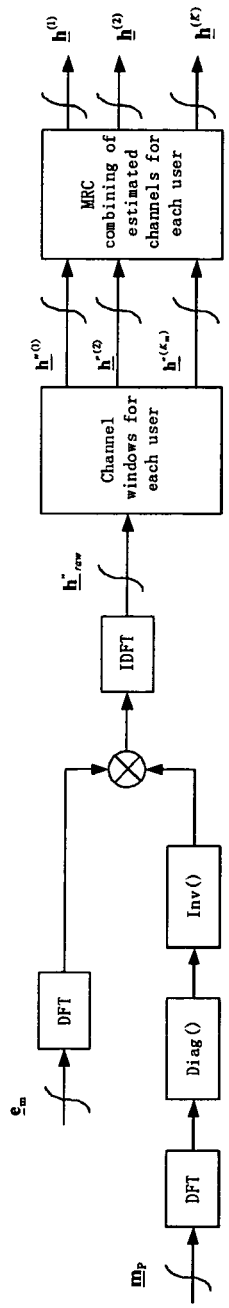
FIG. 3 is a detailed block diagram of the channel estimation portion of the digital baseband configuration of FIG. 2.

FIG. 2 is a block diagram of a digital baseband configuration of a UE, and FIG. 3 is the detailed block diagram of the channel estimation portion of FIG. 2. In this configuration the data split unit extracts the midamble code, $e_m$, from the received signals. The raw channel estimation is given in Equation 1.

$$\underline{h}''_{raw} = IDFT(G^{-1} \cdot DFT(\underline{e}_m)) \qquad \text{Equation 1}$$

where $\underline{G} = diag(\underline{g}) = diag(DFT(\underline{m}_P))$, DFT means Discrete Fourier Transform, and IDFT denotes Inverse Discrete Fourier Transform. Here the raw channel estimation can be reformed as Equation 2.

$$\underline{h}''_j = \underline{h}''_{raw, (j+P+112-(Km-1)W) \bmod P}, j=0,1,\ldots,P-1 \qquad \text{Equation 2}$$

where $K_m$ is the number of the channel estimation window and W is the length of the channel estimation window, $W = \lfloor P/K_m \rfloor$. Therefore, the total channel estimation can be written as:

$$\underline{h}'' = [\underline{h}''_0, \underline{h}''_1, \ldots, \underline{h}''_{P-1}]^T = [\underline{h}''^{(0)T}, \underline{h}''^{(1)T}, \ldots, \underline{h}''^{(K_m-1)T}, \underline{h}''^{(K_m)T}]^T \qquad \text{Equation 3}$$

where $\underline{h}''^{(k_m)}$ is the $k_m$ th channel window's channel estimation.

Here the noise depression consists of two steps: the inter- and the intra-channel windows noise depression. For inter-channel window noise depression the channel power of every channel window is calculated as:

$$P^{(k_m)} = \|\underline{h}''^{(k_m)}\|^2,$$

which is then compared with some pre-determined threshold, $$\underline{h}''^{(k_m)} = \begin{cases} \underline{h}''^{(k_m)} & \text{when } P^{(k_m)} \geq Threshold1 \\ 0 & \text{when } P^{(k_m)} < Threshold1 \end{cases} \qquad \text{Equation 4}$$

Similarly, in relation to the inter-channel window noise depression, for all the users the power of the channel windows $\underline{h}''^{(k_m)}$ is defined as:

$$p_i = \sum_{k_m=1}^{K_m} \|\underline{h}''^{(k_m)}_i\|^2 \quad i=1,2,\ldots,W,$$

where the maximum value of $p_i$, is denoted as P, and a second threshold is define such as Threshold2=10 dB.

$$\underline{h}''^{(k_m)}_i = \begin{cases} \underline{h}''^{(k_m)}_i & \text{when } p_i \geq P - Threshold2 \\ 0 & \text{when } p_i < P - Threshold2 \end{cases}, \qquad \text{Equation 5}$$

$$i=1,2,\ldots,W, \quad k_m=1,2,\ldots,K_m$$

Without loss of generality, powers of the channel windows are reordered as: $P^{(1)} > P^{(2)} > \ldots > P^{(K)} > Threshold1 > P^{(K+1)} > \ldots > P^{(K_m)}$, and a reference vector of $\underline{h}''$ is defined as:

$$\underline{h}'' = \sum_{k_m=1}^{K} (\sqrt{P^{(k_m)}} \cdot \underline{h}''^{(k_m)}), \qquad \text{Equation 6}$$

where the power of $\underline{h}''$ is denoted as $P_{h''}$.

Now if $\underline{h}''$ is taken as the reference, the channel window of all the users can be expressed as:

$$\underline{h}''^{(k_m)} \approx \lambda_{k_m} \cdot e^{j\hat{\theta}_{k_m}} \underline{h}'' \quad k_m=1,2,3,\ldots,K \qquad \text{Equation 7}$$

where the multiplier $\lambda_{k_m} = \sqrt{P^{(k_m)}/P_{h''}}$, and the angle $\hat{\theta}_{k_m}$ need to be estimated.

One way to estimate $\hat{\theta}_{k_m}$ is as follows:

$$\hat{\theta}_{k_m} = \arg\min_{\hat{\theta}_{k_m}}\left(\|\underline{h}''^{(k_m)} - \hat{\underline{h}}''^{(k_m)}\|^2\right) \qquad \text{Equation 8}$$

Figure 4:
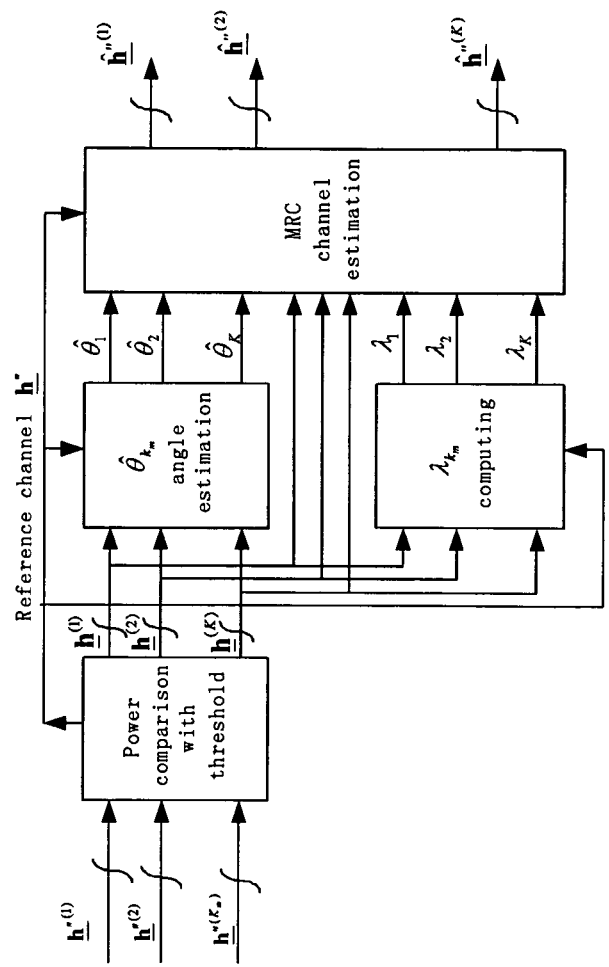
FIG. 4 is a block diagram of a maximum ratio combining (MRC) of estimated channel for each user, in accordance with an embodiment of the invention.

FIG. 4 is a block diagram of a maximum ratio combining (MRC) of estimated channel for each user, in accordance with an embodiment of the invention. Assuming that the original channel taps are h, and defining the mean squared error (MSE) between the original channels and the estimated ones as:

$$MSE_{old} = \sum_i \sum_j (\|h - \underline{h}''^{(k_m)}\|)^2_{i,j}; \text{ and}$$

$$MSE_{new} = \sum_i \sum_j (\|h - \hat{\underline{h}}''^{(k_m)}\|)^2_{i,j}$$

the simulation runs on the TD-SCDMA downlink platform indicate some performance enhancement by the scheme.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily to the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless this "Detailed Description" section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. An apparatus for maximum ratio combining (MRC) channel estimation, in a Time-Division, Synchronous Code-Division Multiple Access (TD-SCDMA) communication system utilizing Joint Detection processes, wherein transmitted signals comprise a plurality of time overlapping coded signals transmitted from individual remote units, each coded signal transmitted within the same timeslot and distinguishable only by a specific encoding, and wherein the encoding comprises a midamble, the apparatus comprising:
   a data splitter, extracting the midambles;
   a channel estimator, estimating users' channels;
   a power calculator, calculating the power of every channel window;
   a power comparator, comparing the calculated powers with a specified threshold and adjusting the user channel estimations accordingly;
   an angle estimator, estimating the angles used in MRC channel estimation;
   a multiplier calculator, computing the multipliers used in MRC channel estimation; and
   an MRC channel estimator, wherein the estimator utilizes the outputs of the channel estimator, the power calculator, the power comparator, the angle estimator, and the multiplier calculator.

2. The apparatus of claim 1, wherein the power calculations are of the form $P^{(k_m)} = \|\underline{h}''^{(k_m)}\|^2$ and $\underline{h}''^{(k_m)}$ is the user's $k_m$ th channel estimation.

3. The apparatus of claim 1, wherein the power comparison with a specified threshold and adjusting of the user channel estimations are of the form $$\underline{h}''^{(k_m)} = \begin{cases} \underline{h}''^{(k_m)} & \text{when } P^{(k_m)} \geq Threshold1 \\ 0 & \text{when } P^{(k_m)} < Threshold1 \end{cases},$$

and where $\underline{h}''^{(k_m)}$ is the user's $k_m$ th channel estimation and $P^{(k_m)} = \|\underline{h}''^{(k_m)}\|^2$.

4. The apparatus of claim 1, wherein the angle estimation is of the form of $$\hat{\theta}_{k_m} = \arg\min_{\hat{\theta}_{k_m}}\left(\|\underline{h}''^{(k_m)} - \hat{\underline{h}}''^{(k_m)}\|^2\right).$$

5. The apparatus of claim 1, wherein the multiplier calculation is of the form $\lambda_{k_m} = \sqrt{P^{(K)}/P_{h''}}$.

6. The apparatus of claim 1, wherein the an MRC channel estimation is of the form $\underline{h}''^{(k_m)} \approx \lambda_{k_m} \cdot e^{j\hat{\theta}_{k_m}} \underline{h}'' \quad k_m=1,2,3,\ldots,K$.

7. In a Time-Division, Synchronous Code-Division Multiple Access (TD-SCDMA) communication system utilizing Joint Detection processes, a method for maximum ratio combining (MRC) channel estimation, the method comprising:
   a step of extracting the midamble portion of a transmitted signal;
   a step of estimating users' channels;
   a step of calculating the power of every user channel window;

a step of comparing the calculated powers with a specified threshold and adjusting the user channel estimations accordingly;

a step of estimating angles used in MRC channel estimation;

a step of computing multipliers used in MRC channel estimation; and a step of computing the MRC channel estimations using the angles, the multipliers, the powers, and the estimated channels.

8. The method of claim 7, wherein the step of power calculations are of the form $P^{(k_m)}=\|\underline{h}''^{(k_m)}\|^2$ and $\underline{h}''^{(k_m)}$ is the user's $k_m$ th channel estimation.

9. The method of claim 7, wherein the step of power comparison with a specified threshold and adjusting of the user channel estimations are of the form $$\underline{h}''^{(k_m)} = \begin{cases} \underline{h}''^{(k_m)} & \text{when } P^{(k_m)} \geq Threshold1 \\ 0 & \text{when } P^{(k_m)} < Threshold1 \end{cases},$$

and where $\underline{h}''^{(k_m)}$ is the user's $k_m$ th channel estimation and $P^{(k_m)}=\|\underline{h}''^{(k_m)}\|^2$.

10. The method of claim 7, wherein the step of angle estimation is of the form of $$\hat{\theta}_{k_m} = \arg\min_{\hat{\theta}_{k_m}}(\|\underline{h}''^{(k_m)} - \hat{\underline{h}}''^{(k_m)}\|^2)).$$

11. The method of claim 7, wherein the step of multiplier calculation is of the form $\lambda_{k_m}=\sqrt{P^{(k_m)}/P_{h''}}$.

12. The method of claim 7, wherein the step of an MRC channel estimation is of the form $\hat{\underline{h}}''^{(k_m)} \approx \lambda_{k_m} \cdot e^{j\hat{\theta}_{k_m}} h'' k_m=1,2,3,\ldots,K$.

13. In a Time-Division, Synchronous Code-Division Multiple Access (TD-SCDMA) communication system utilizing Joint Detection processes, an apparatus for maximum ratio combining (MRC) channel estimation, the apparatus comprising:

a means for extracting the midamble portion of the transmitted signal;

a means for estimating users' channels;

a means for calculating the power of every channel window;

a means for comparing the calculated powers with a specified threshold and adjusting the user channel estimations accordingly;

a means for estimating angles used in MRC channel estimation;

a means for computing multipliers used in MRC channel estimation; and a means for computing the MRC channel estimates.

14. In a Time-Division, Synchronous Code-Division Multiple Access (TD-SCDMA) communication system, a Joint Detection process comprising:

a step of extracting the midamble portion of the transmitted signal;

a step of estimating users' channels, further comprising:
  a step of Discrete Fourier Transformation of the extracted midamble;
  a step of formation of a diagonal matrix using the transformed complex midamble;
  a step of inversing the diagonal matrix; and
  a step of Inverse Discrete Fourier Transformation of the inversed matrix;

a step of calculating the power of every channel window;

a step of comparing the calculated powers with a specified threshold and adjusting the user channel estimations accordingly;

a step of estimating angles used in maximum ratio combining channel estimation;

a step of computing multipliers used in maximum ratio combining channel estimation; and a step of computing the maximum ratio combining channel estimates using the angles, the multipliers, the powers, and the estimated users' channels.

15. The Joint Detection process of claim 14, wherein the step of channel estimation is of the form $\underline{h}''_{raw}=\text{IDFT}(\underline{G}^{-1}\cdot\text{DFT}(e_m))$, where $\underline{G}=\text{diag}(\underline{g})=\text{diag}(\text{DFT}(\underline{m}_P))$, DFT is Discrete Fourier Transform, and IDFT denotes Inverse Discrete Fourier Transform.

16. The Joint Detection process of claim 14, wherein the step of multiplier calculation is of the form $\lambda_{k_m}=\sqrt{P^{(k_m)}/P_{h''}}$.

17. The Joint Detection process of claim 14, wherein the step of multiplier calculation is of the form $\lambda_{k_m}=\sqrt{P^{(k_m)}/P_{h''}}$.

18. A wireless communication system based on time division duplexing, the system comprising:

a receiver; and a computer system capable of:
  receiving input data from the receiver;
  extracting the midambles of the input data;
  estimating users' channels;
  calculating the power of every channel window;
  comparing the powers with a specified threshold;
  adjusting the user channel estimations accordingly to comparison results;
  estimating the angles used in maximum ratio combining channel estimation;
  computing the multipliers used in maximum ratio combining channel estimation; and
  performing maximum ratio combining channel estimation utilizing the channel estimations, the power calculations, the adjustment results, the angle estimations, and the multiplier calculations.

* * * * *